United States Patent [19]

Okada et al.

[11] Patent Number: 5,030,498

[45] Date of Patent: Jul. 9, 1991

[54] DISPLAYING SHEET AND WINDOW DISPLAY SIGNBOARD IN WHICH SAID DISPLAY SHEET IS UTILIZED

[76] Inventors: Mitsuo Okada, 1-39-801, Tanimachi 7-chome, Chuoku, Osaka city, Osaka; Jiroh Sumitani, 18-21, Yamanoue 5-chome, Hirakata city, Osaka, both of Japan

[21] Appl. No.: 365,889

[22] Filed: Jun. 14, 1989

[51] Int. Cl.⁵ .......................... B32B 1/04; B32B 3/06
[52] U.S. Cl. ...................................... 428/99; 428/196; 428/204; 428/205; 428/246
[58] Field of Search ................. 428/99, 196, 204, 205, 428/246

[56] References Cited
FOREIGN PATENT DOCUMENTS 52-88993 12/1975 Japan .
58-7173 7/1981 Japan .

*Primary Examiner*—Alexander S. Thomas
*Attorney, Agent, or Firm*—Armstrong, Nikaido, Marmelstein, Kubovcik, & Murray

[57] ABSTRACT

A flexible display sheet and a frame for displaying the display sheet. The display sheet has a layered structure including a woven cloth made of synthetic resin, a first transparent vinyl chloride resin layer laminated on one side of the layered cloth, a second white vinyl chloride resin layer laminated to the other side of the woven cloth, a layer of urethane resin coated on the second resin layer and display pigments thermally transferred to a surface of the coating layer opposite to the second resin layer. With this layered structure, the expression of letters, designs and images does not become vague or unclear, the displaying surface is very clear and good light permeation is provided from the rear side of the display sheet. The frame includes longitudinal and horizontal cross pieces with opposed cross pieces having concave portions. A fitting member is provided at each of two opposite ends of the flexible display sheet and the fitting members are each secured in one of the concave portions to removably attach the display sheet to the frame.

2 Claims, 13 Drawing Sheets

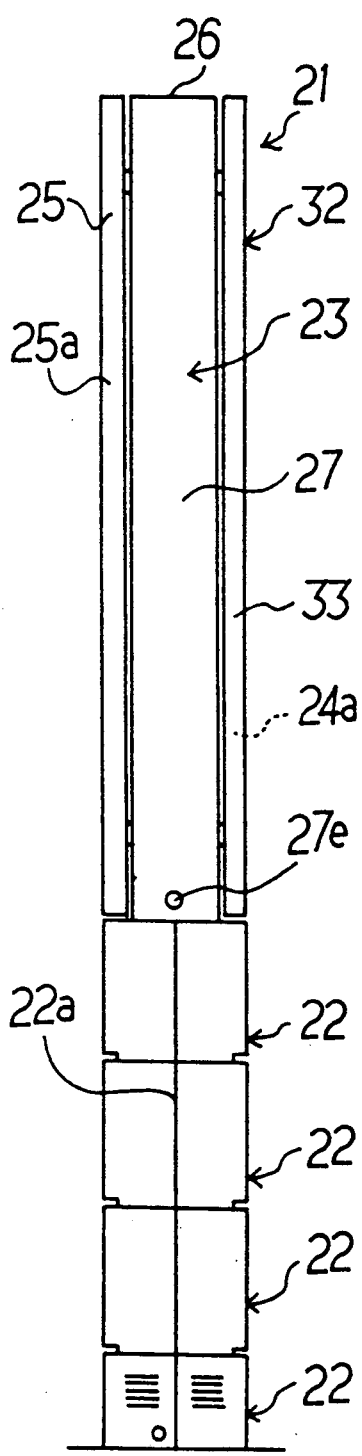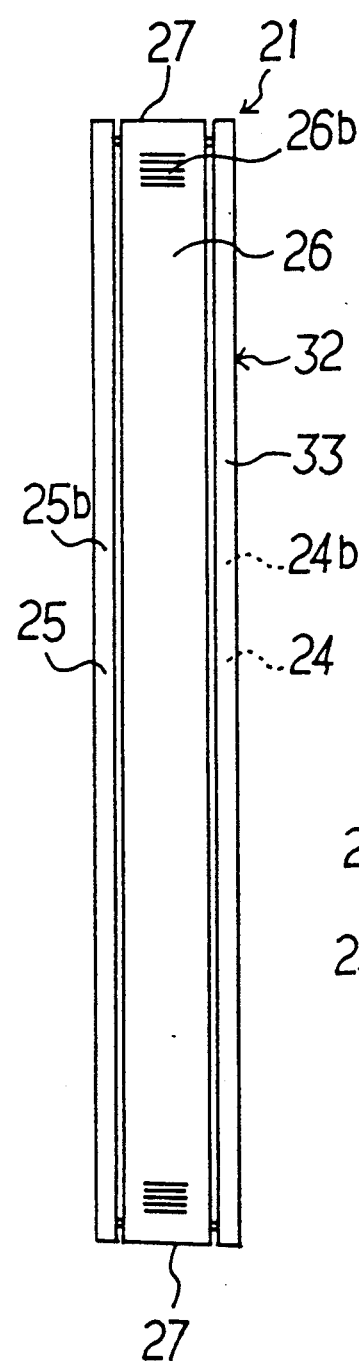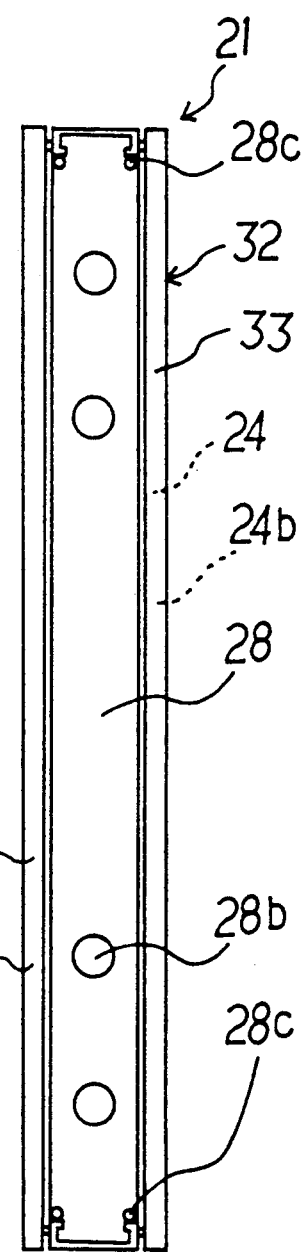

DISPLAYING SHEET AND WINDOW DISPLAY SIGNBOARD IN WHICH SAID DISPLAY SHEET IS UTILIZED

FIELD OF UTILIZATION IN THE INDUSTRIES

This invention pertains to display sheets and window display signboards in which said display sheet is used.

One of the important purposes of this invention is to provide display sheets whose displaying surface is very clear, which ensures good permeation of light from the illumination means in said signboard frame to the illustration surface when said displaying sheet is attached to a signboard frame in which illumination means is provided and is used as signboard, and at the same time which can reflect light well when said display sheet is exposed to light from the outside of said signboard frame, and to provide window display signboards which are used together with said display sheets.

CONVENTIONAL ARTS

It is well known that acrylate resin plate has been conventionally utilized as display members attached to signboards. However, acrylate resin plate is heavy and is inconvenient to carry and sometimes said acrylate resin plates are apt to be broken.

So, recently vinyl chloride resin plate has appeared, said vinyl chloride resin sheet is flexible and has light permeation property. Said vinyl chloride resin sheet on which displaying description and signs are expressed is used, being attached to a signboard frame.

Said sheet (d) is so composed that the first resin layer consisting of transparent vinyl chloride is laminated to one side of a woven cloth (a) as shown in FIG. 9 and the second resin layer consisting of white-colored vinyl chloride is laminated on the other side thereof.

As said vinyl chloride resin sheet (d) is flexible in comparison with acrylate resin sheets, it is more convenient to carry and attach said vinyl chloride resin sheet (d) to a signboard frame than acrylate resin sheets, and said sheet (d) has excellent features, which can permeate light from inside the signboard frame to outside thereof and can reflect light from the outside thereof.

There are some ways to express letters and graphic designs or images on said vinyl chloride resin sheet (d), in one of which a graphic designer can draw designs and/or images on said sheet (d) by using an air brush, in other of which designs or images can be printed on the surface (i.e., surface of the second resin layer (c) thereof) of said sheet (d) by means of silk screen, and in still other of which those designs and/or images can be thermally transferred by using transfer sheets on which displaying pigments are coated.

In drawing designs and images on the surface of said sheet (d) (surface of the second resin layer (c)) by an air brush or in printing those by means of silk screens, displaying pigments (e) are adhered only to the surface (i.e., of the second resin layer (c)) of said sheet (d) as shown in FIG. 13. Therefore, even though such display sheets (f) as manufactured as shown in the above is attached to a signboard frame (not illustrated herein) and is given light from the inside thereof, light from the inside of said signboard frame can not be permeated to the outside from said displaying pigments, and the displaying description (letters, designs and images) can not be easily seen at night time and on being cloudy even in the daytime.

On the other hand, as said pigments (e) are permeated inside said displaying sheet (f) in displaying sheet (f) which can be obtained by thermally transferring a transfer paper (g) on which displaying pigments (e) are coated, to said sheet (d), light can be permeated to outside said displaying sheet (f) when illumination is given to said displaying sheet from inside the signboard frame with said sheet attached thereto. Therefore, it is easily possible to express the details of description (letters, designs, and images) even when it is dark.

As shown in FIG. 10 and FIG. 11, a production method of thermal transfer type displaying sheets is such that a transfer paper (g) (not illustrated) is placed on said second resin layer (c) of said sheet (d) and thereafter pigments (e) coated on said transfer paper (g) are transferred to said sheet (d) by a thermal transfer equipment (not illustrated). (Subjects intended to be solved by the present invention)

However, there have been some problems, as explained below, in said displaying sheets which have been produced on said sheets (d) by the conventional manufacturing method.

Namely, as said first resin layer (b) and said second resin layer (c) of said sheets (d) are usually composed of vinyl chloride resin including plasticizer like "DOP" (dioctyl phthalate), said pigments (e) may be melted down in said plasticizer and may shifts when said pigments are thermally transferred on said sheets (d), and said pigments (e) may permeate said second resin layer (c) and said woven cloth (a) thereof and finally may bleed up to said resin layer (b). (Refer to FIG. 11)

If said pigments (e) permeates or bleeds up to said first resin layer (b), said pigments (e) may be spread in said first resin layer (b). Therefore, it is frequent that the description (letters, designs and images) to be displayed by said displaying sheet (f) may become dull and vague as shown in FIG. 12.

So, the present invention provides displaying sheets whose light permeation is made better from inside a signboard frame by passing said pigments (e) to the middle degree of the thickness of said sheets, preventing said pigments from being too much spread in said sheet when said pigments are thermally transferred on said sheet, and provides an effective production method of said displaying sheets.

On the other hand, window display signboard is mainly installed inside glazed windows of a store and is usually displayed outwards, in order to attract the attention of for pedestrians who walk on pavements or sidewalks.

This kind of signboard usually consists of frame member and a panel attached to said frame member, and the general shape thereof is usually rectangular or square.

Conventionally, an independent window display signboard is directly mounted on the installation surface by means of bolts or the like.

In addition, said panel is fixed to said frame member or is removably mounted to said frame member.

Said window display signboard which has been mentioned in the above has some problems as shown explained below;

Namely, when changing the position of installation of said window display signboard, the height dimension there of may not be matched to another installation place because said window display signboard is completely of an independent body. In this case, said window display signboard must be replaced with another one whose dimensions are suitable to a specified location.

Furthermore, if a display panel is fixed to a frame member like a conventional window display signboard when changing the expression of letters, designs and images on said window display signboard, the whole window display signboard itself must be replaced with another one.

Besides, even though said display panel is removably attached to said frame member, it has the following problems, too.

When removing said display panel under such conditions that said display panels are often drawn near the glazed window of a store, a worker may not enter a narrow space between said display panel and said glazed window. Therefore, a worker shall stretch out his hands from the rear side of said window display signboard and shall remove said display panel forwards. Thereafter, he shall lift said display panel upwards of said window display signboard for removing. Furthermore he shall lift up another new display panel and shall place it in a position by reversing the above procedure.

So, the replacement itself is a heavy work. In addition, its internal maintenance is very inconvenient, and the whole display shall be replaced with another new one. Therefore, it is very uneconomical, too.

Window display signboards which have faults, which were mentioned in the above, inherently due to the structure thereof, do not match this era in which there are a great deal of informations and the cycle of information change is very frequent.

BRIEF DESCRIPTION OF DRAWINGS

FIG. 16 is the side view thereof, FIG. 17 is the plane view thereof, FIG. 18 is the bottom view of said signboard.

DETAILED DESCRIPTION OF THE PRESENT INVENTION

The following description deals with one of the embodiments of the present invention with reference to the drawings attached hereto.

Figure 1:
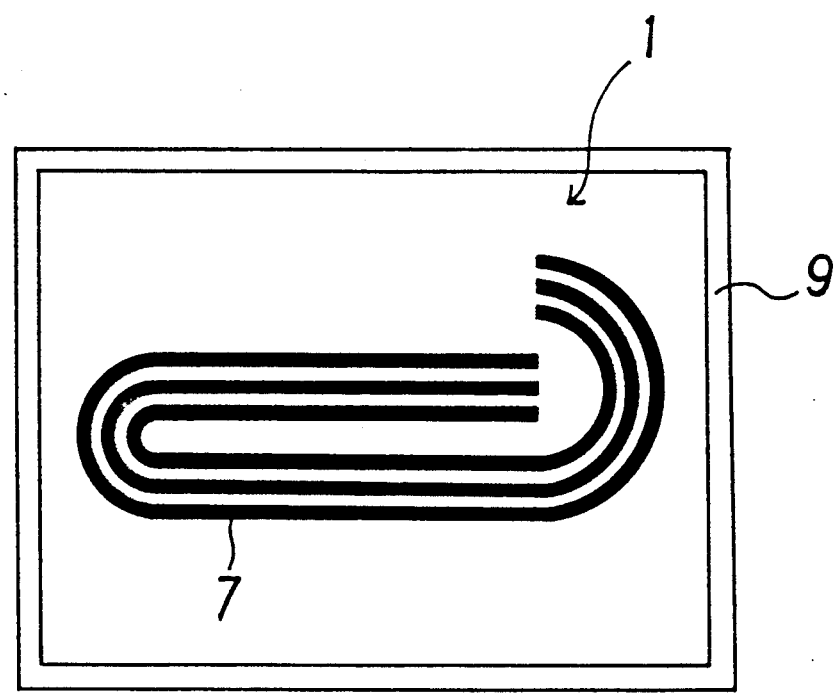
FIG. 1 is the front elevational view showing a state that display sheets disclosed by the present invention is attached to a signboard frame.
Figure 2:
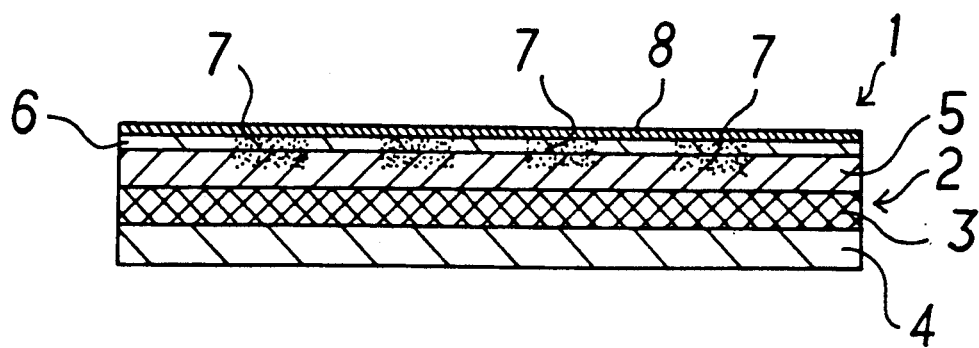
FIG. 2 is a sectional view of said display sheets.

FIG. 1 and FIG. 2 show the front elevational view and the sectional view of display sheets disclosed by the present invention, respectively.

This display sheet (1) consists of sheet (2) on which displaying pigments (7) are thermally transferred.

Said sheet (2) consists of woven cloth (3), the first resin layer (4), the second resin layer (5) and another coating layer (6).

Said woven cloth (3) is made of synthetic resin fabric like low-contractible polyester, etc. and said woven cloth (3) can give proper flexibility and strength to said sheet (2) and can uniformly spread light supplied to said sheet (2) at the same time.

On one side of said woven cloth (3), the first resin layer (4) is laminated, which is composed of transparent polyvinyl chloride.

A commonly used plasticizer like "DOP" (dioctyl phthalate) is included in this polyvinyl chloride to secure flexibility.

On the other side of said woven cloth (3), the second resin layer (5) is laminated as well, which is composed of white-colored polyvinyl chloride.

As well as said first resin layer (4), plasticizer is included in said polyvinyl chloride according to common use method.

A coating layer (6) is formed on the surface of said second resin layer (5) by coating a coating agent.

As this coating layer (6), urethane oriented resin is used. In this embodiment, co-polymerized resin of acrylate resin and urethane oriented resin or mixed resin (acrylate urethane resin) thereof is favorably used.

The thickness of said sheet (2) excluding said coating layer (6) is for instance 350 $\mu$m to 600 $\mu$m, and the thickness of said coating layer (6) is about 10 $\mu$m to 13 $\mu$m.

Displaying pigments (7) are thermally transferred from the surface of said coating layer (6) of said sheet (2).

Said display pigments (7) are permeated in said second resin layer (5) from said coating layer (6) but not permeated in said first resin layer (4).

Cast paper (8) is thermally transferred to the side on which said displaying pigments (7) are transferred, of said display sheet (1) so composed as shown in the above, thereby causing luster to be secured.

Said display sheet (1) is attached to a signboard frame (9) as shown in FIG. 1, and is installed outdoors and indoors for display.

As in said display sheet (1) said displaying pigments (7) are only permeated to a middle degree, that is, up to said second resin layer (5), as shown in the above, said displaying pigments (7) can be prevented from diffusion (in the direction of sheet surface) in said sheet (2).

Window display signboard consists of a signboard proper (21) and a base structure frame (22), which are made of light-weighted members like thin steel materials.

Said signboard proper (21) is composed of a pair of panel frame (24) and other panel frame (25) removably mounted to the body structure frame (23).

The body base frame (23) is composed of a top plate (26), side plates (27) (27), and bottom plate (28) in series, all the outer peripheral portions (26a), (27a) and (28a) are bent and formed to be L-shaped inwardly thereof.

Said top plate (26) and said bottom plate (28) are furnished with heat radiation holes (26b) and (28b) in order to radiate heat which may be generated by an illumination means in the signboard body (1). (Refer to FIG. 17 and FIG. 18).

As shown in FIG. 18, said bottom plate (28) are furnished with some necessary number of bolt holes (28c) in order to be linked with said base structure frame (22).

A bracket (27b) is fixed on the inner wall of the said side plates (27) (27), in order to mount an illumination means (46) hereinafter described in details.

Figure 19:
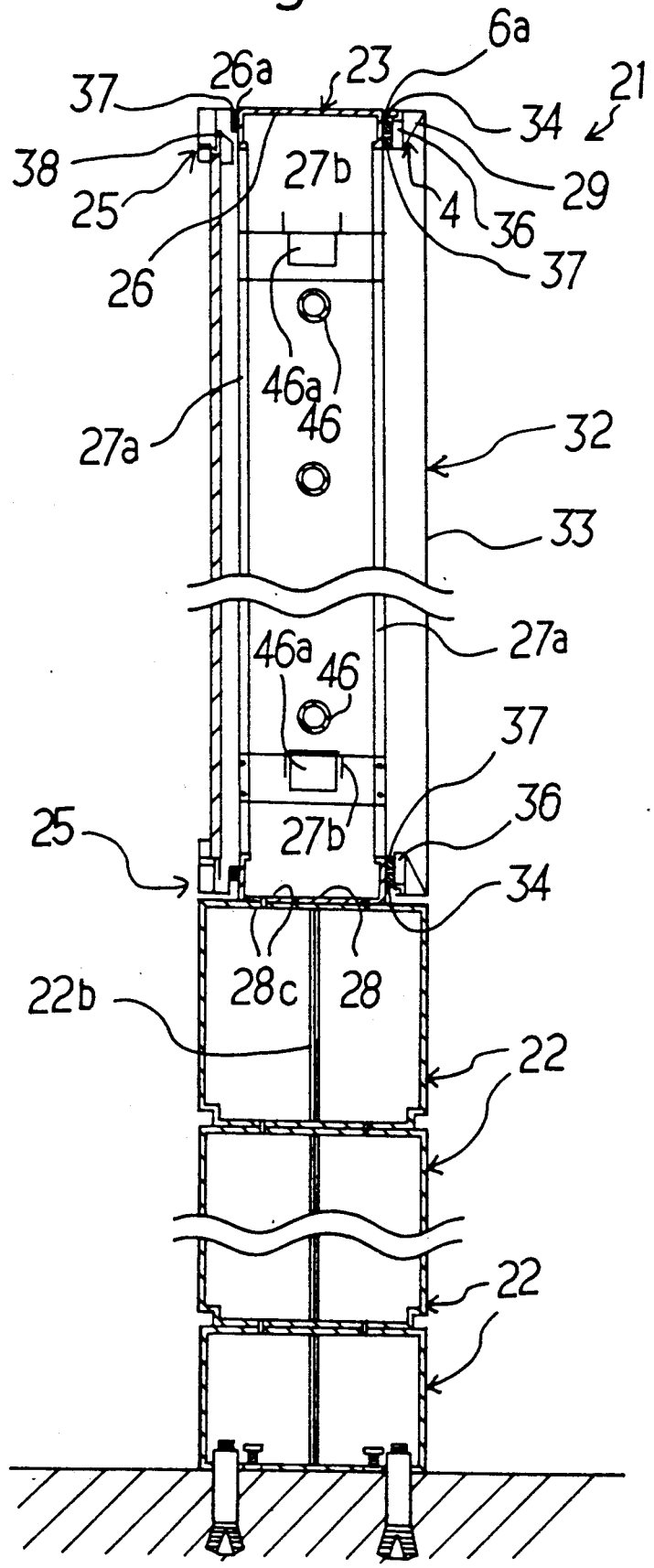
FIG. 19 is the sectional view drawn alongwith the line 19—19 in FIG. 1.

The shape of said bracket (27b) shall be formed to be roughly U-shaped as shown in FIG. 19.

Figure 20:
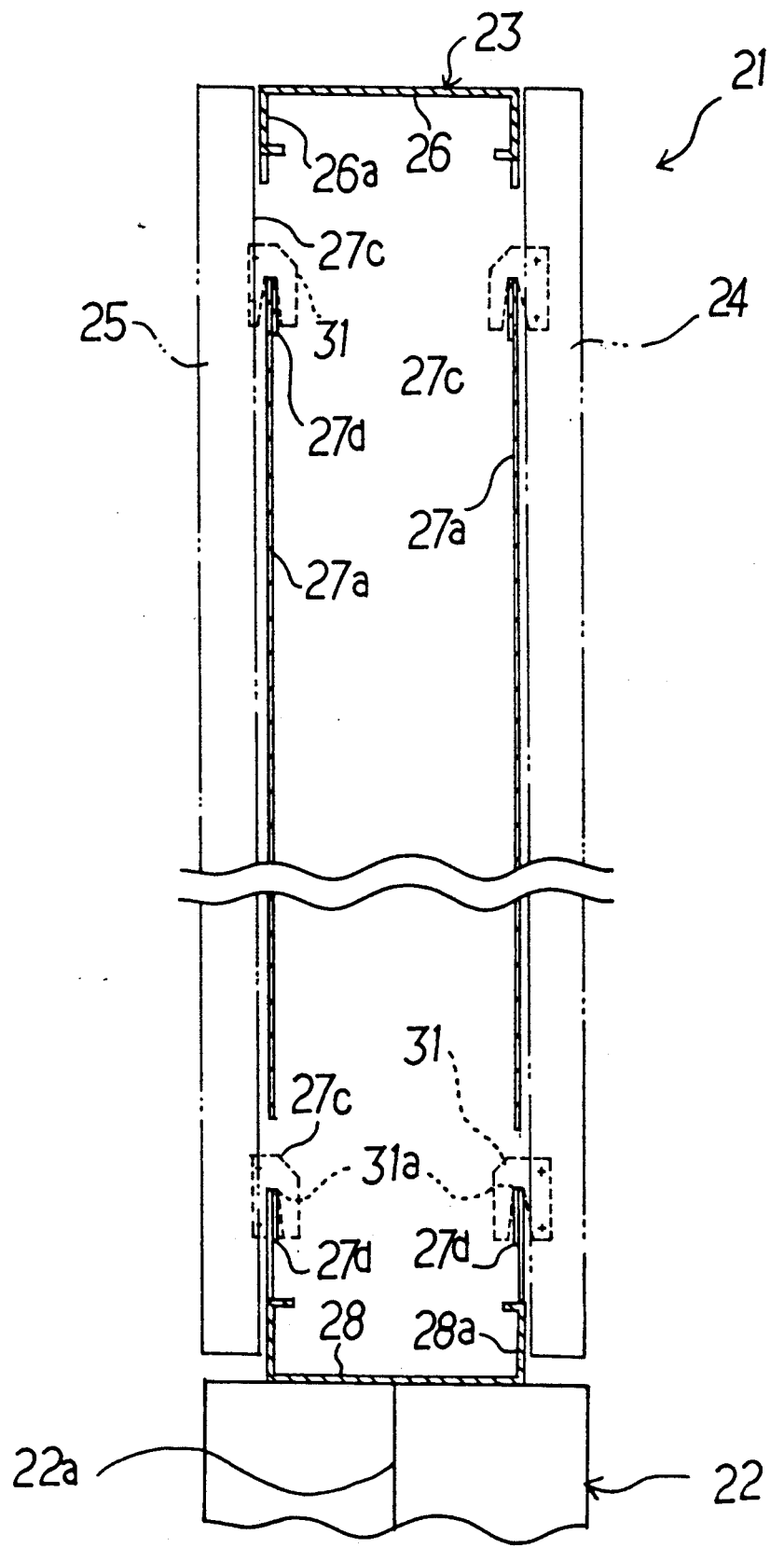
FIG. 20 is the sectional view drawn alongwith the line 20—20, partially drawn with imaginary lines, in FIG. 14.

As described in FIG. 20 and FIG. 26, some necessary number of longitudinal slits (27c) are provided at said peripheral edge portion (27a) in order to mount and remove said one panel frame (24) and other panel frames (25) (In this embodiment of the present invention, two slits at one side of said side plate (27)).

(27d) is a reinforcement plate.

As shown in FIG. 16 to FIG. 18, one panel frame (24) is furnished with longitudinal cross pieces (24a) and horizontal cross pieces (24b), whose dimensions are roughly equivalent to the longitudinal and horizontal dimensions of said body structure frame (23), respectively.

Said panel frame (24) has its outer frame member (29) and inner frame member (30) which is placed inside said outer frame member (29).

Figure 21:
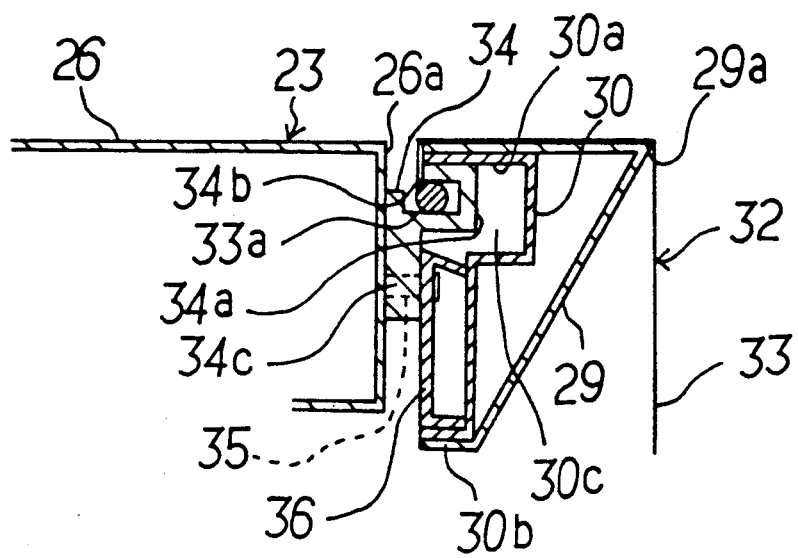
FIG. 21 is a partially sectional view showing the mounted condition of said display sheet.
Figure 25:
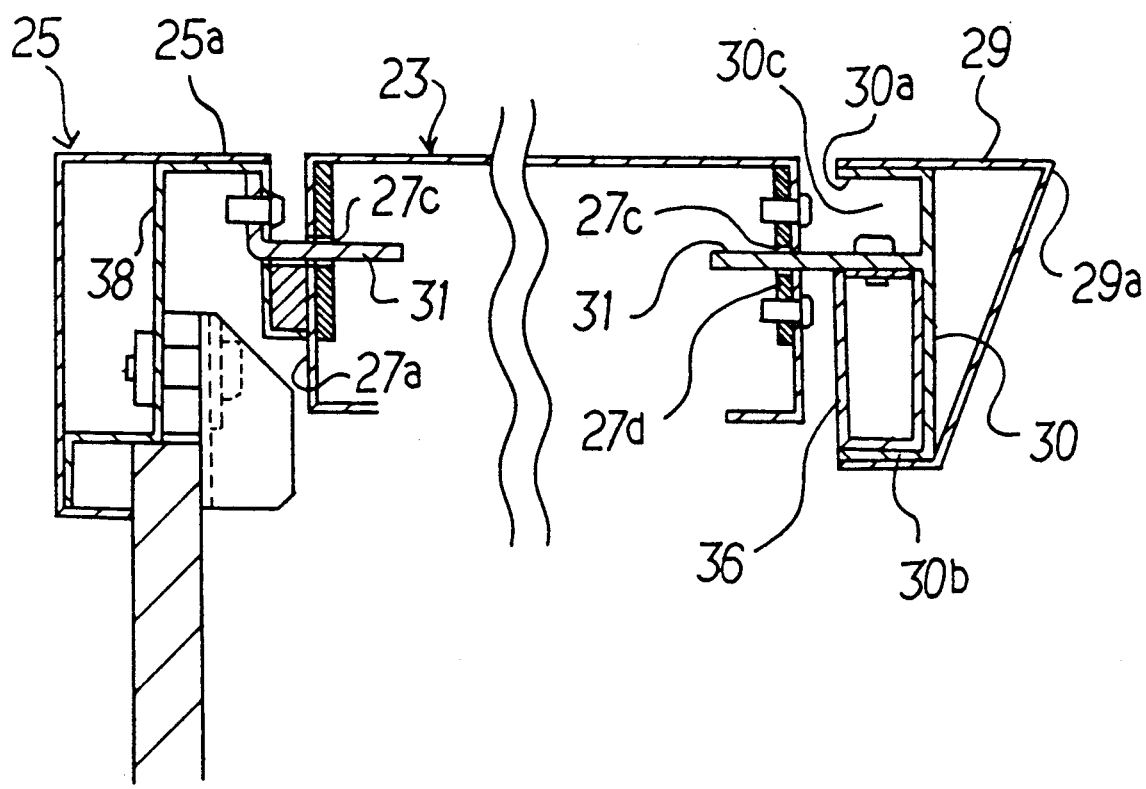
FIG. 25 is a partially sectional view drawn alongwith the line 25—25 in FIG. 14.

Said outer frame member (29) of said one panel frame (24) is a member whose outer corner portion (29a) is very acute outwardly thereof as shown in the sectional views of FIG. 19, FIG. 21 and FIG. 25.

Said inner frame member (30) is a member whose outer peripheral portion (30a) and inner peripheral portion (30b) are placed in said outer frame member (29).

As described later, said inner frame member (30) is provided with a concave portion (30c) for insertion of fitting member (34).

The inside of said inner frame member (30) is furnished with hooking brackets (31) ... which is applied and hooked to said slits (27c) ... which are grooved at said side plates (27) (27). (See FIG. 20 and FIG. 25).

These hooking brackets (31) has reversed V-shaped concave portion (31a), as shown in FIG. 20.

Said concave portion (31a) are positioned and hooked in the lower edge portion of said slits (27c).

Displaying sheet (32) can be removably stretched for displaying of letters, designs and images at said one panel frame (24).

Figure 22:
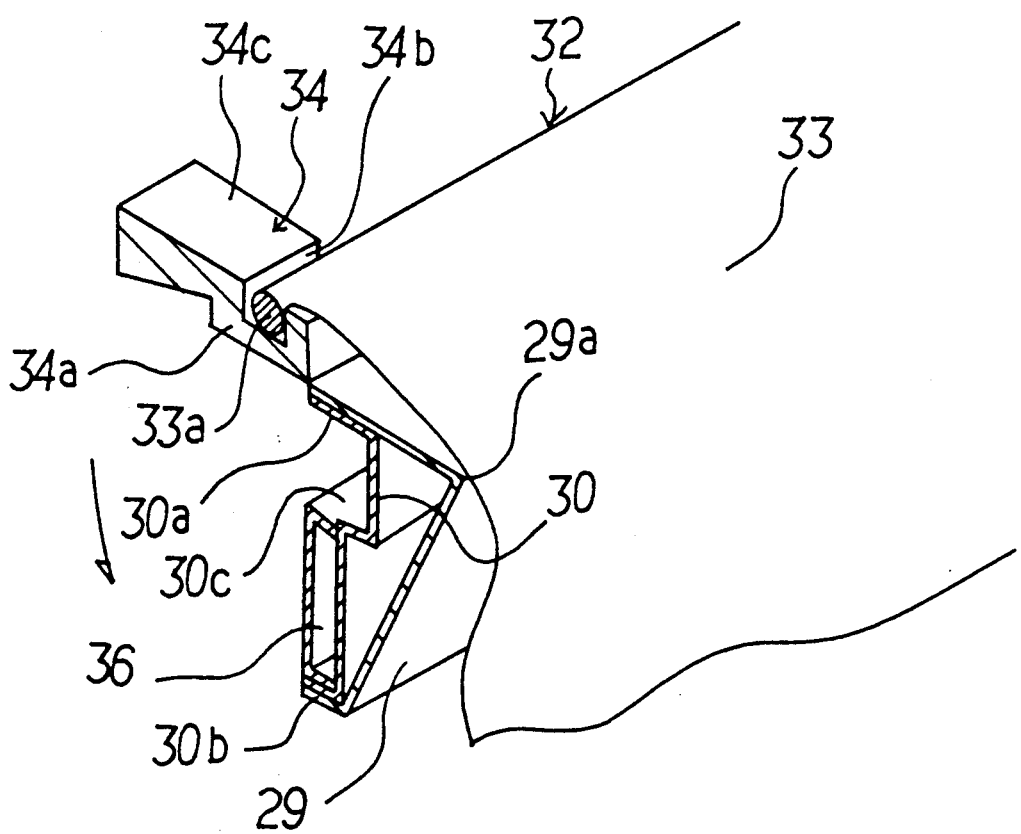
FIG. 22 is a partially sectional and perspective view thereof.
Figure 23:
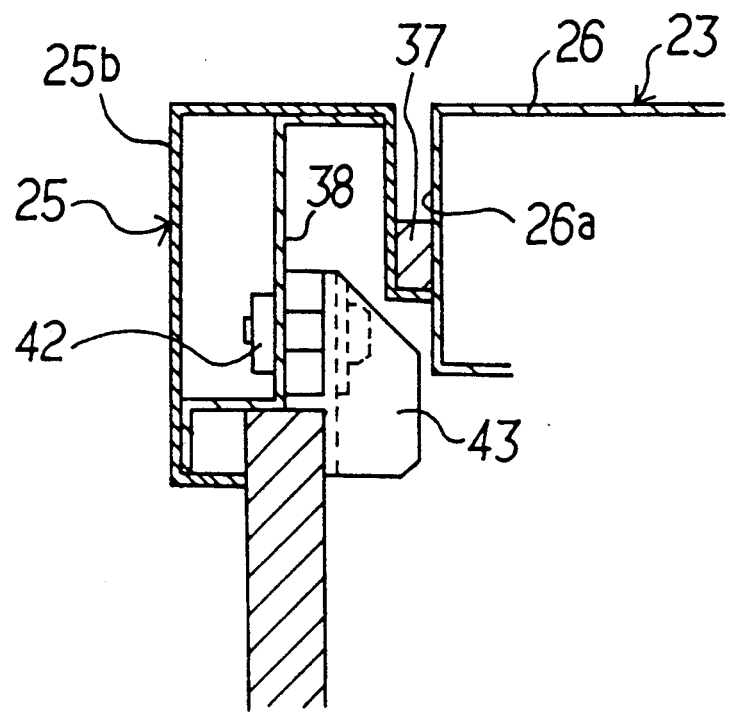
FIG. 23 is a partially sectional view of the mounted part of displaying members.
Figure 24:
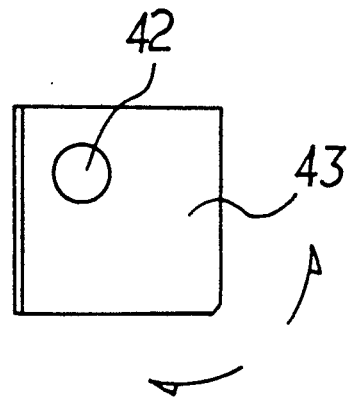
FIG. 24 is the front elevational view of the mounting brackets.

Said displaying sheet (32) has a sheet (33) and a fitting member (34) (Refer to FIG. 21 and FIG. 22).

A round bar (33a) is attached by sewing to or welded to the peripheral edge portion of said sheet (33).

Cloth or synthetic resin sheet material is used as flexible member which constitute said sheet (33).. However, in the present embodiment, said illumination means (46) is mounted in said body structure frame (23), and said display sheet (1) disclosed by the present invention is used instead.

Said fitting member (34) is attached to the peripheral edge portions of said display sheet (1), in this embodiment, to four corners of said sheet (33).

Said fitting member (34) consists of a fitting convex portion (34a), a channel (34b) and a fixing portion (34c). Said sheet (33) is integrally combined with said fitting member (34) by such a manner that said round bar (33a) is pre-inserted into said channel (34b).

Said display sheet (32) so composed as shown in the above description can be mounted and spread to the surface of said one panel frame (24) by fitting of said fitting convex portion (34a) in said fitting concave portion (30c) of said inner frame member (30).

As for the procedure of mounting and spreading said display sheet (32) to the surface of said one panel frame (24), first of all, either of said fitting members (34) is inserted in said fitting concave portion (30c) of said one panel frame (24). Thereafter, the remaining fitting members (34) are inserted in said fitting concave portion (30c) as pulling as shown in FIG. 22.

After said fitting member (34) is inserted in said fitting concave portion (30c), tightening means like screws (35) are tightened to a spacer (36) placed between said fixing portion (34c) and said inner frame member (30).

Said inner frame member (3) and said spacer (36) may be so shaped as shown in FIG. 21 or may be so shaped as shown in FIG. 25.

Said one panel frame (24) to which said display sheet (1) is mounted and spread is attached to said structure frame (23) by means of said hooking brackets (31).

At this time, as said illumination means (46) is built in said body structure frame (23) in this embodiment as shown in FIG. 19, some packing (37) is provided, in order to prevent light from leakage, between said peripheral edge portions (26a), (27a), and (28a) of said body structure frame (23) and said one panel frame (24).

Said packing (37) has almost the same thickness as that of said fixing portion (34c) of said fitting member (34) and is placed at all the other portions than those where said fitting member (34) is fit in said one panel frame (24).

Figure 3:
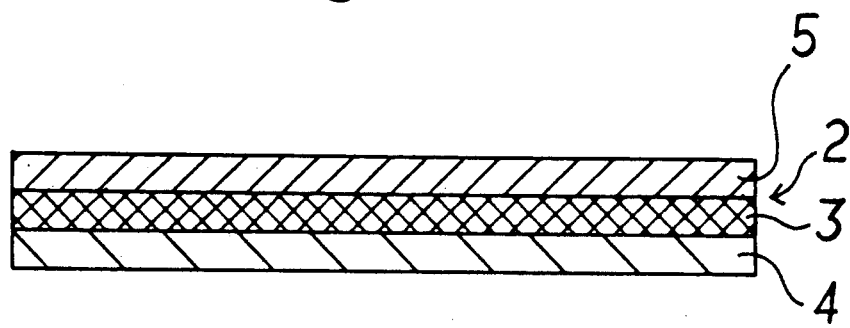
FIG. 3 to FIG. 8 are sectional views showing respective processes of production method of said display sheets disclosed by the present invention.
Figure 8:
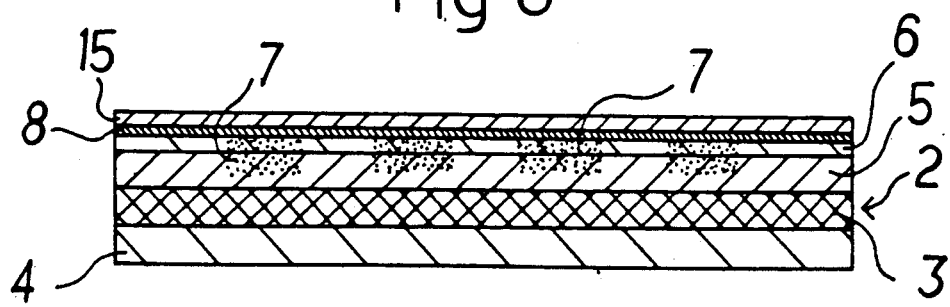
Figure 9:
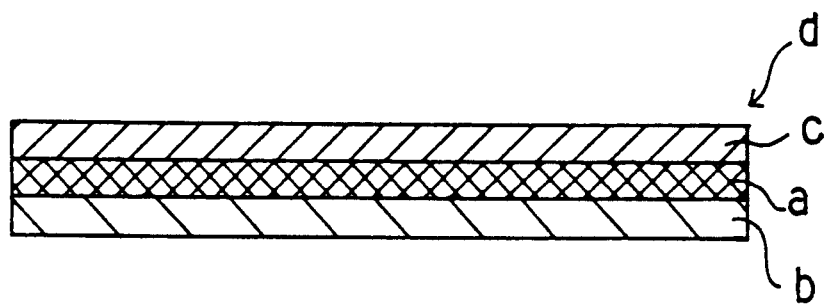
FIG. 9 to FIG. 11 are sectional views showing each process of the conventional production method of display sheets.
Figure 10:
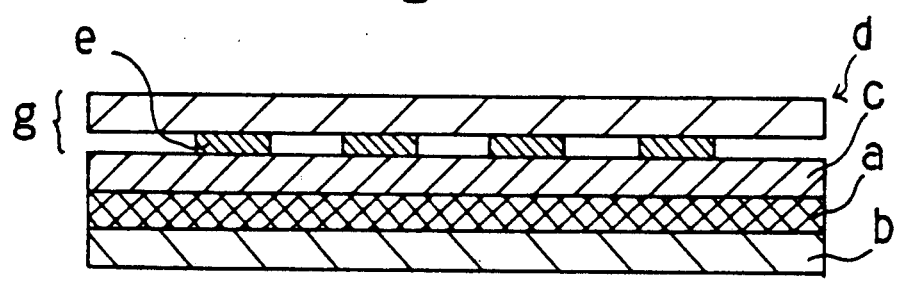
Figure 11:
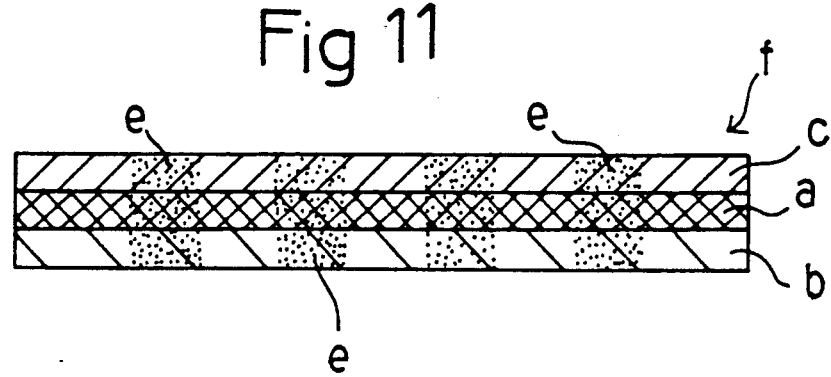
Figure 12:
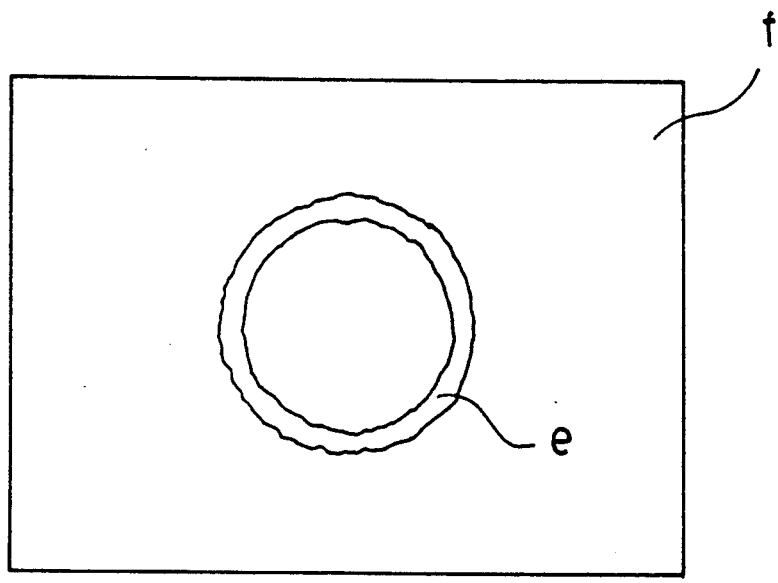
FIG. 12 is the front elevational view showing display sheets which are produced by the conventional thermal transfer method.
Figure 13:
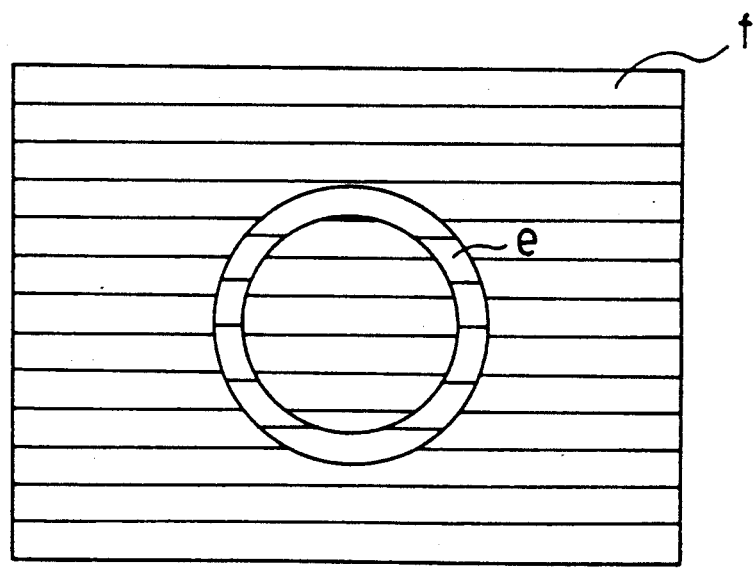
FIG. 13 is another elevational view, on being dark, of display sheets for which displaying pigments are coated only on the surface thereof.
Figure 14:
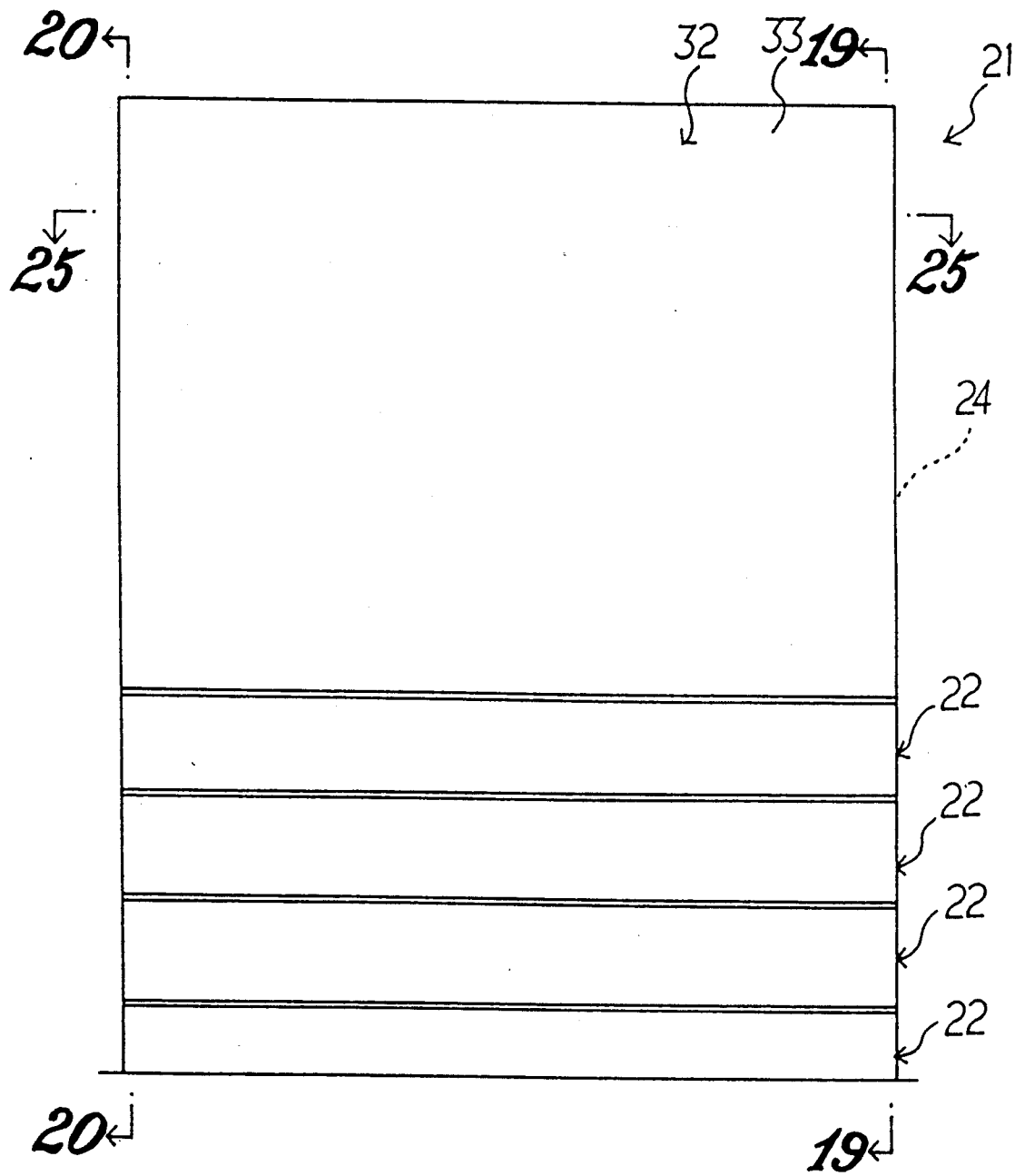
FIG. 14 is the front elevational view showing a window display signboard related to the present invention.
Figure 15:
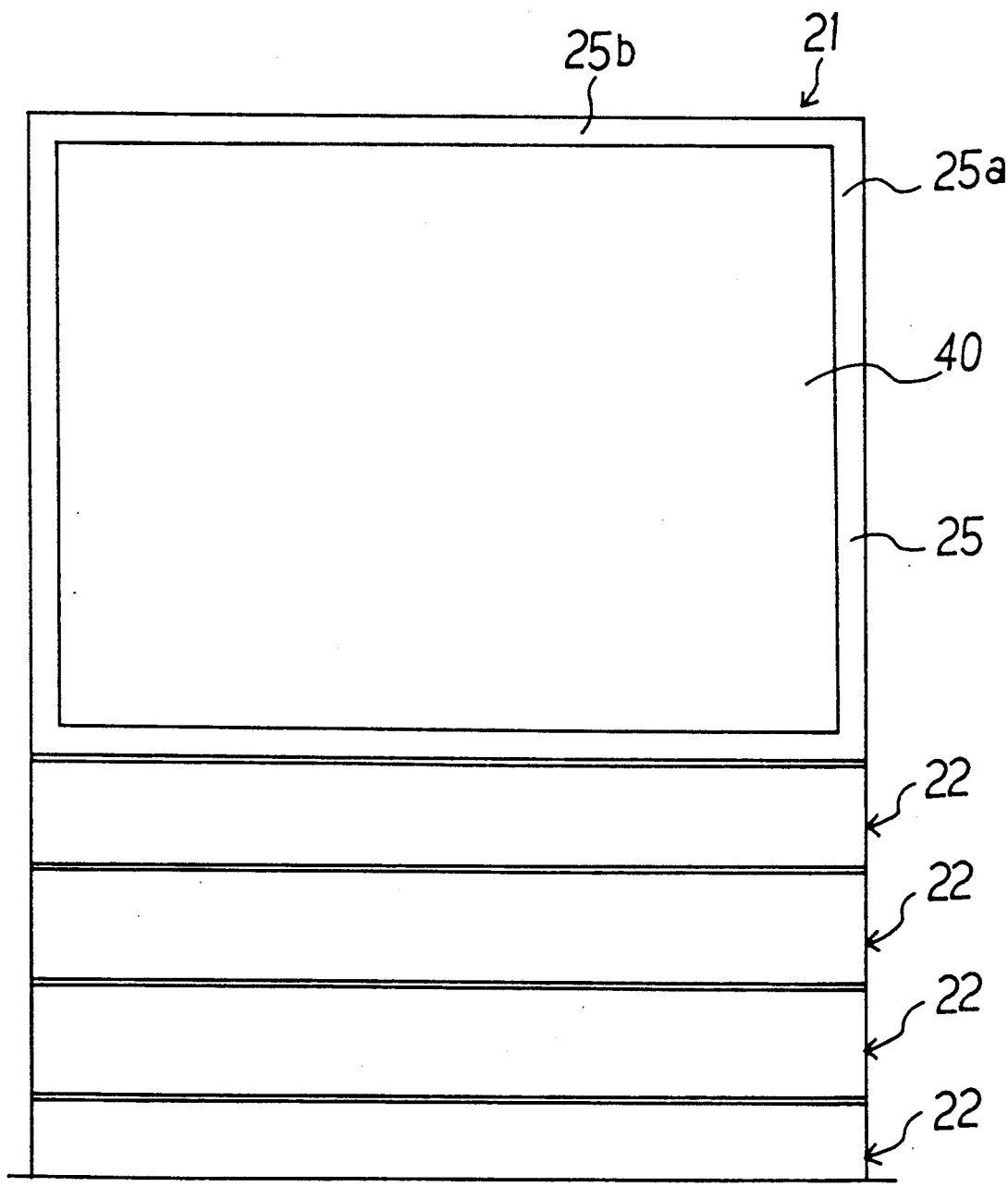
FIG. 15 is the rear elevational view thereof.

Next, a production method of display sheets, which has been disclosed by the present invention, is explained in details, in compliance with FIG. 3 and FIG. 8.

FIG. 3 shows a flexible sheet which has been produced in advance.

Said flexible sheet consists of woven cloth (3), the first resin layer (4) laminated on one side of said woven cloth (3) and the second resin layer (5) laminated on the other side of said woven cloth.

Figure 4:
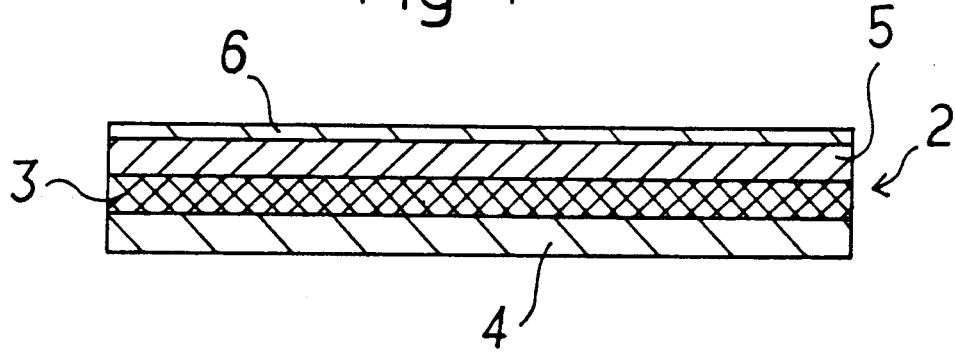

A coating layer (6) is formed by coating a coating agent mainly composed of urethane oriented resin to said flexible sheet. (See FIG. 4).

The thickness of said coating layer (6) is roughly 10 $\mu$m to 13 $\mu$m as shown in the above description.

Figure 5:
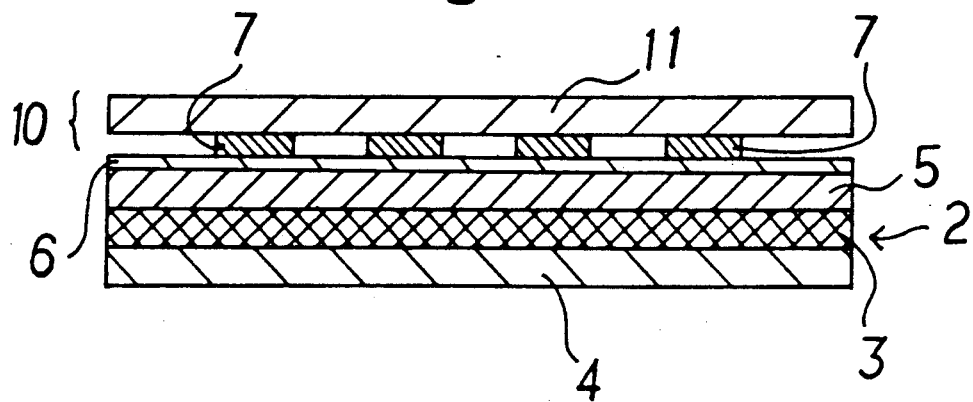

A transfer paper (10) to which displaying pigments (7) are coated is placed on said sheet (2). (See FIG. 5).

(11) is the rear side of said transfer paper (10).

Figure 6:
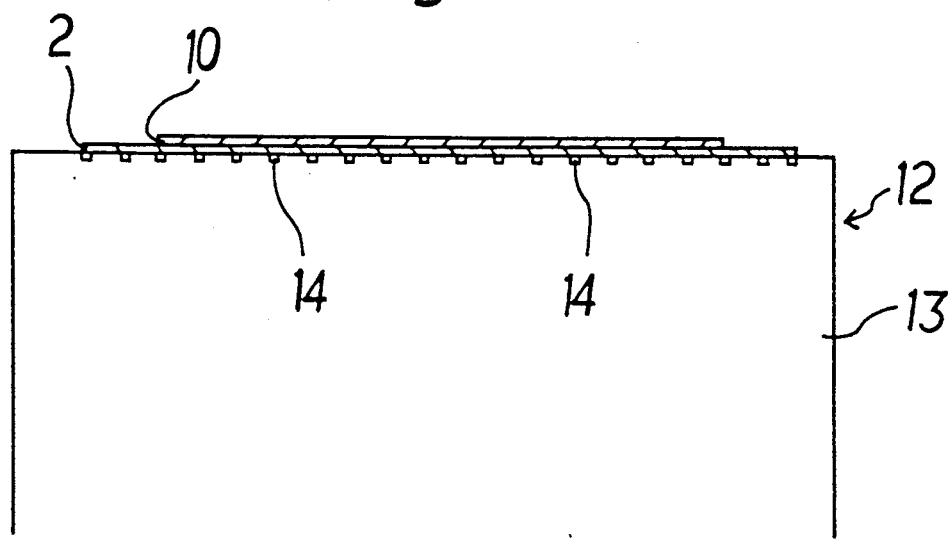

Next, said sheet (2) is arranged on a thermal transfer equipment (12) (only main parts thereof illustrated) as shown in FIG. 6, and said displaying pigments (7) are thermally transferred by said thermal transfer equipment (12).

Said thermal transfer equipment (12) has a plurality of air ports (14) provided on the base (13) thereof.

The action on thermal transfer is as shown below;

First of all, said transfer paper (10) is heated at a temperature of 110° C. for about 1 minute by a heating source (not illustrated herein) of said thermal transfer equipment (11).

At the same time, air is absorbed through a plurality of said air ports (14) for vacuum, thereby causing said sheet to be closely adhered to the base (13).

The force for this absorption is 10 tons per square meter in this embodiment.

As heat is given to said transfer paper (10), said displaying pigments (7) is sublimated. At the same time, particles which exist in said second resin layer (5) and said first resin layer (4), which compose said sheet (2), are expanded.

Accordingly, clearances are generated between and among said particles due to this expansion, thereby causing said sublimated displaying pigments to be permeated.

While clearances are being generated between and among said particles, there is a possibility for air to enter these clearances, in addition to said displaying pigments. However, as air is absorbed through said air ports (14), said air may not be involved between and among said particles.

Thereby, such problems as defective fixing of said displaying pigments (7) to said particles due to air involved among said particles and uneven distribution of said displaying pigments due to air bubbles can be completely prevented.

Figure 7:
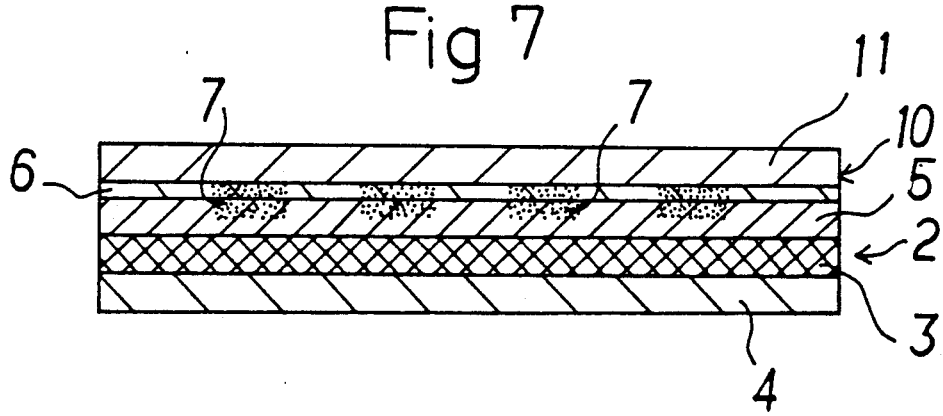

As a result of this thermal transfer, sublimated displaying pigments (7) are transferred inside said sheet (2) and are well fixed. (See FIG. 7).

In the embodiment disclosed by the present invention, as a coating layer (6) is formed on said second resin layer (5) of said flexible sheet before a transfer paper is thermally transferred, said displaying pigments (7) can not be permeated to the vicinity of the rear side of said sheet (2), i.e., up to said first resin layer (4) by virtue of said coating layer. Said display pigments (7) may be allowed to enter only up to a middle degree of said sheet i.e., said second resin layer (5).

Therefore, it can be well prevented that the expression (letters, designs and images) becomes vague and/or unclear owing to permeation of said displaying pigments (7) nearly to the rear side of said sheet (2).

After thermal transfer ic completed, the backing sheet (11) of said transfer paper (10) is peeled off from said sheet (2), thereby causing a displaying sheet to be completed now.

Furthermore, thereafter, a transparent cast paper (8) is placed at the side of said coating agent (6) of said displaying sheet (1) as shown in FIG. 8, and said cast paper (8) is thermally transferred to said displaying sheet (1) by means of a thermal transfer equipment.

After the termination of this thermal transfer process, the backing sheet of said cast paper (8) is peeled off, thereby causing a displaying sheet (1), which is shown in FIG. 2, to be completely formed, and causing said displaying sheet (1) to be much lustrous on the surface thereof by transfer of said cast paper (8).

SUMMARY

The present invention relates to displaying sheets comprising a woven cloth made of synthetic resin fabric, a first resin layer made of transparent vinyl chloride laminated on one side thereof, a second resin layer made of white vinyl chloride laminated on the other side of said woven cloth, and a coating layer made of urethane oriented resin coated on the surface of said second resin layer, displaying pigments being thermally transferred to the surface of said coating layer so that said display pigments may be permeated from said coating layer to said second resin layer, and further relates to window displaying signboards. As said displaying pigments are permeated and transferred to said coating layer or from said coating layer to said second resin layer by virtue of existence of a coating layer made of urethane oriented resin, said displaying pigments are not spread in said first resin layer, thereby causing the expression (letters, designs and images) not to become vague or unclear and the displaying surface to be very clear, and light to be permeated from the rear side of said displaying sheet in good conditions.

When this displaying sheet is attached to a signboard and used for displaying, the expression and/or display itself is very clear, and the expression or displaying surface can be made uniformly bright by means of an illumination means from inside said signboard frame. Furthermore, light given from the outside of said displaying sheet can be reflected in good conditions.

What we claim is:

1. A display sheet comprising: a woven cloth made of synthetic resin, a first resin layer made of transparent vinyl chloride laminated on one side of said woven cloth, a second resin layer made of white vinyl chloride laminated on the other side of said woven cloth, a coating layer made of urethane resin coated on said second resin layer, and display pigments thermally transferred to a surface side of said coating layer opposite to said second resin layer and permeating said display sheet no further than said second resin layer.

2. A display sheet as defined by claim 1 in combination with a signboard wherein said signboard is comprised of a body structure and a frame having longitudinal and horizontal cross pieces, opposed cross pieces of said frame are provided with concave portions, a fitting member provided at each of the concave portions of said opposed cross pieces, a fitting member provided at each of two opposite ends of said display sheet, and said fitting members are each secured in one of said concave portions of said opposed cross pieces whereby said display sheet is removably attached to said frame.

* * * * *